(12) United States Patent
Chang

(10) Patent No.: US 7,739,468 B2
(45) Date of Patent: Jun. 15, 2010

(54) DATA PROTECTION SYSTEM FOR CONTROLLING DATA ENTRY POINT EMPLOYING RFID TAG

(76) Inventor: Min-Ta Chang, 4F. No. 9, Alley 15, La. 175, Sec. 2, Hoping E. Rd., Da-an, Taipei (TW)

( * ) Notice: Subject to any disclaimer, the term of this patent is extended or adjusted under 35 U.S.C. 154(b) by 360 days.

(21) Appl. No.: 11/755,596

(22) Filed: May 30, 2007

(65) Prior Publication Data

US 2007/0283116 A1 Dec. 6, 2007

(30) Foreign Application Priority Data

Jun. 2, 2006 (TW) ............................... 95119686 A

(51) Int. Cl.
*G06F 12/14* (2006.01)
(52) U.S. Cl. .................. 711/163; 711/152; 711/164
(58) Field of Classification Search ................ None
See application file for complete search history.

(56) References Cited

U.S. PATENT DOCUMENTS 7,340,559 B2 * 3/2008 Ito et al. .................... 711/103
7,407,110 B2 * 8/2008 Davis et al. ............ 235/472.02
2007/0276984 A1 * 11/2007 Schuessler .................. 711/100

FOREIGN PATENT DOCUMENTS

TW 00550459 9/2003
TW 00591630 6/2004

* cited by examiner

*Primary Examiner*—Than Nguyen
(74) *Attorney, Agent, or Firm*—WPAT, P.C.; Anthony King

(57) ABSTRACT

In the data protection system for controlling a data entry point, a storage unit for storing data includes a data entry point area and a data area for storing the physical data, in which the data entry points inside the data entry point area are pointed to specific sectors inside the data area, respectively. Therefore, if an authorized user does not know where the data entry point is, he or she cannot obtain the data from the data area. The system is to provide a corresponding data entry point only when a RFID TAG, similar to a key, is to disable locking, so that a corresponding computing apparatus can then read or write data to and from the storage unit inside the system. On the contrary, data cannot be read or written after the locking is enabled, so that data protection is achieved.

8 Claims, 3 Drawing Sheets

DATA PROTECTION SYSTEM FOR CONTROLLING DATA ENTRY POINT EMPLOYING RFID TAG

BACKGROUND OF THE INVENTION

1. Field of the Invention

The present invention relates generally to a data protection system, and in particular, to a data protection system controlling a data entry point.

2. The Prior Arts

A conventional computer operating system protects data with an authentication account/password. Although some authentication accounts/passwords of some operating systems are harder to be cracked; however, once a data processing apparatus for a hard disk driver is disassembled from a computer, the data stored therein will be easily read by another computer.

In order to solve the above problem, Taiwanese patent publication no. 550459 provides a computer data protection apparatus. The technical feature of the above patent is to add the aforementioned computer data protection apparatus in between a host (or the CPU of a computer) and a hard disk drive, and to achieve the object of data protection through the use of encryption/decryption during the reading and writing of data from the hard disk drive.

However, if someone disassembles this hard disk drive together with the computer data protection apparatus, the data stored therein can still be read using an internal decryption mechanism, so that the object of data protection still remains unable to be effectively achieved.

Taiwanese patent publication no. 591630, titled "Data Protection Apparatus and Data Encryption Method for Storage Media", has overcome the problem faced by the Taiwanese patent publication no. 550459 by using a password-authentication unit. Although with the technique provided in the patent which is titled "Data Protection Apparatus and Data Encryption Method for Storage Media", the problem of compromising data protection due to the removal of both the hard disk and the data protection apparatus can thereby be avoided since it can be decided upon whether to allow the decryption mechanism to run the data decryption program based upon the authentication results of the verified password; nevertheless, such manual password set up can still be cracked.

In addition, in comparison to the hard disk drive, a data processing apparatus, such as a floppy disk drive, a flash memory read-write device, a ZIP disk drive, a JAZ disk drive, and a disk apparatus, as similar to which a compact disk can be easily taken from a CD drive, is easier to be taken inside a storage media to store data. Therefore, an improved universal data protection mechanism is needed.

In recent years, because of the swift development in the optical disk burning technology, the compact disks for storing multimedia, games, and application programs are easily cracked no matter whichever data protection means are adopted. Therefore, the data protection method required a major breakthrough to overcome the above problems.

SUMMARY OF THE INVENTION

A primary objective of the present invention is to provide a data protection system for controlling a data entry point, which makes reading or writing operations impossible unless such reading or writing operation is authorized upon using the correct data entry point; thus by controlling the data entry point, the object of data protection is thereby achieved.

Based on the above objective according to present invention, a storage unit for storing a plurality of data includes a data entry point area and a data area for the actual storage of data inside the data protection system controlling a data entry point, wherein a plurality of data entry points inside the data entry point area are pointed to a plurality of specific sectors inside the data area, respectively. Therefore, if an illegal user doesn't know where the data entry point is to be, he or she cannot obtain the data from within the data area. The system will provide a corresponding data entry point only upon when a RFID TAG, similar to a key, has provided authentication so that a corresponding computing apparatus is allowed access for reading or writing data to and from the storage unit inside the system. On the contrary, data cannot be read or written after the access lockout is enabled, so that the object of data protection is achieved.

The advantages and spirit of the present invention will be better understood by reading the following detailed description of the present invention, when considered in connection with the accompanying drawings.

DETAILED DESCRIPTION OF THE PREFERRED EMBODIMENT

Figure 1A:
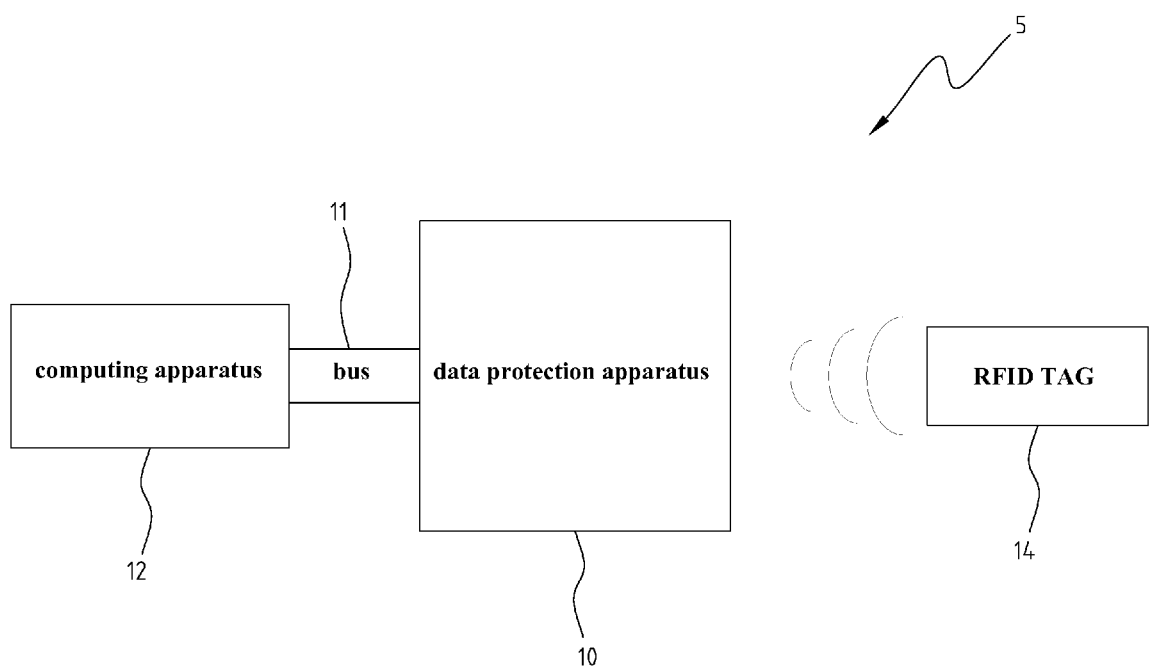
FIGS. 1A~1B are a plurality of schematic block diagrams illustrating a data protection system controlling a data entry point according to the present invention.
Figure 1B:
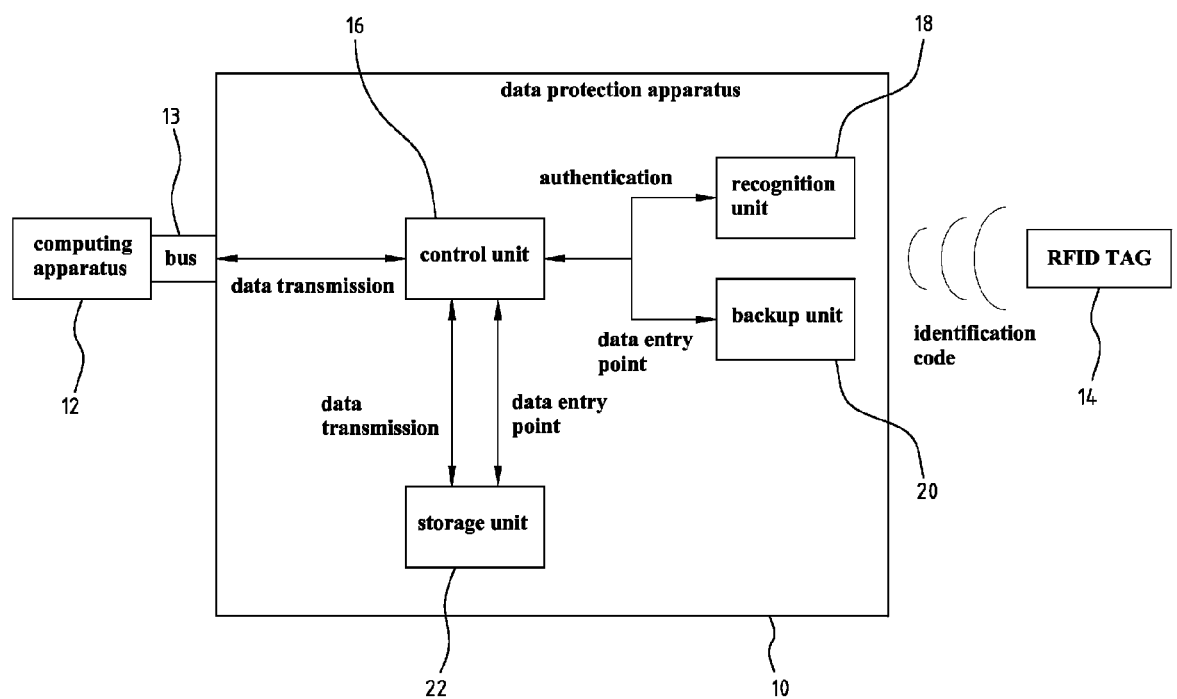

Referring to FIGS. 1A~1B, FIGS. 1A~1B are a plurality of schematic diagrams of a data protection system controlling a data entry point according to an embodiment of the present invention. FIG. 1A shows a data protection system 5 controlling a data entry point according to the embodiment of the present invention includes a data protection apparatus 10, a RFID TAG 14, and a computing apparatus 12 (such as a PDA which can store and process data), where the RFID TAG 14 and the computing apparatus 12 both belong to a user.

In brief, if a user is to allow access to read or write data to and from the data protection system 5, the computing apparatus 12 and the data protection apparatus 10 should be electrically connected through a bus 13 (such as USB, IDE and ATA) and the RFID TAG 14, similar to a key, should disable the lockout. An identification code stored in the RFID TAG 14 that may be implemented in the form of RFID in the present system can replace the conventional account and password, since an authentication program is automatically started when the RFID TAG 14 approaches the data protection apparatus 10, and if the RFID TAG 14 is successfully authenticated, it can then be used for enabling and disabling the lockout (also called "locking"). The user, therefore, does not need to input his account and password; as a result, it is a convenient authentication method for the user. The word "locking" is to mean that when a control unit 16 in FIG. 1B enables access lockout of the data protection system 5 according to the successful authentication by using the identification code of a specific RFID TAG 14, the corresponding computing unit 12 then cannot read or write data to and from a storage unit 22.

Figure 2:
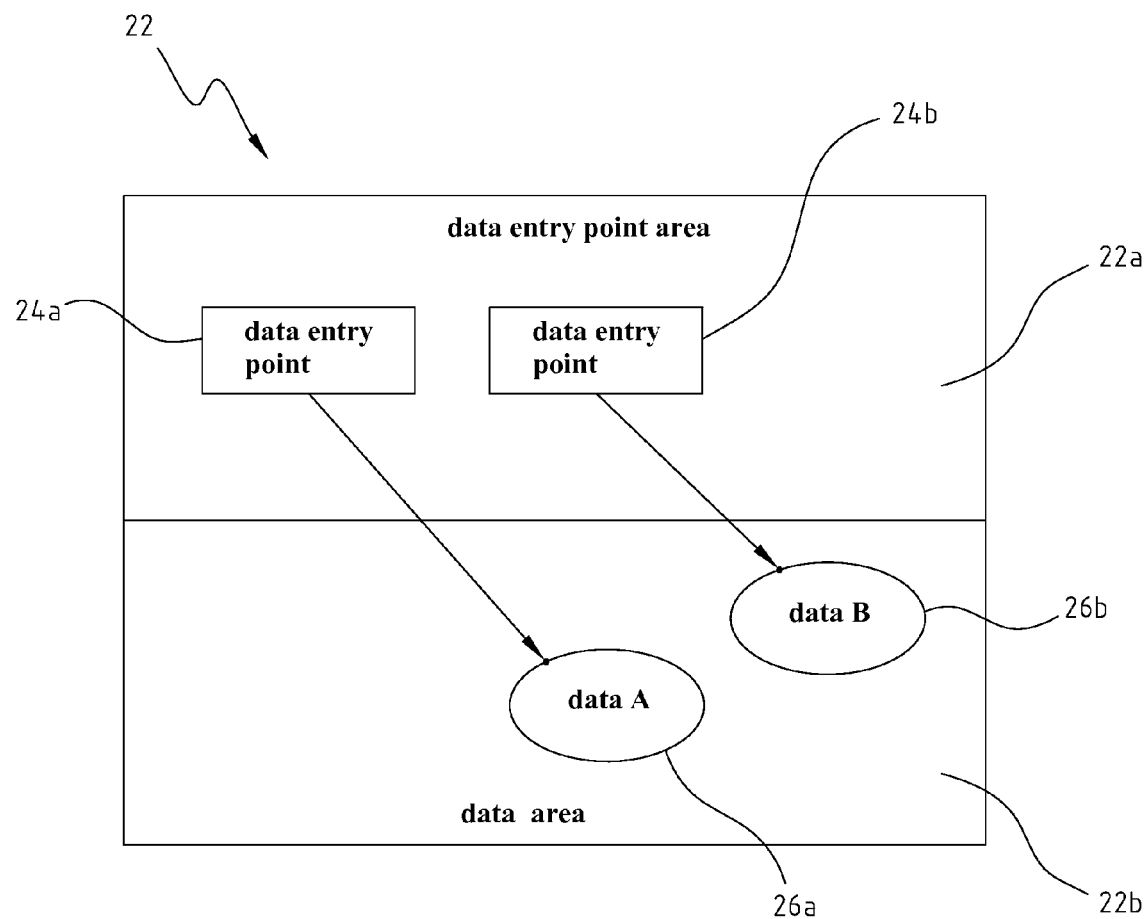
FIG. 2 is a schematic diagram of a storage unit according to the present invention.

It is to be noted that using the RFID TAG 14 for authentication is not the most important feature of the present invention. FIG. 1B shows that according to the embodiment of the present invention, after an authentication unit 18 has successfully authenticated the RFID TAG 14, a control unit 16 is then allowed access to a data entry point (which is pointing to a location where the data are actually stored) corresponding to the identification code as obtained from a backup unit 20. Then data transmission can be performed through this data entry point, i.e. the needed data can be obtained from the storage unit 22 and transmitted to the computing apparatus 12 or the data can be obtained from the computing apparatus 12 and transmitted and to write to the storage unit 22. In other words, if the rejected RFID TAG 14 has attempted to disable the locking, the control unit 16 will reject to read or write in response to the read/write requests from the computing apparatus 12, which makes the unauthenticated user unable to gain access to the data since he or she is not authenticated and does not know the location of the data entry point (as shown in FIG. 2). In the following, it will be described in detail how to achieve proper authentication, in which instances where disabling and enabling of the locking are performed and how to read or write data through the data entry point.

FIG. 2 is a schematic block diagram of the storage unit 22 according to the embodiment of the present invention. FIG. 2 shows in the data protection system 5 controlling a data entry point according to the present invention, the storage unit 22 for storing data includes a data entry point area 22a, a data area 22b for storing the physical data, in which a plurality of data entry points 24a and 24b inside the data entry point area 22a are pointed to a plurality of specific sectors inside the data area 22b, respectively (entry points for data A 26a and data B 26b).

For example, when the RFID TAG 14 approaches the authentication unit 18, since the data entry point 24a corresponding to the identification code of the RFID TAG 14 is already found inside a backup unit 20 and each data entry point is allocated to the identification codes of the same or a different RFID TAG 14, the authentication unit 18 can swiftly assess whether the RFID TAG 14 is authenticated, and notifies the authentication results to the control unit 16. When the control unit 16 recognizes the authentication results are proper, it enables the computing apparatus 12 to read from or write in the storage unit 22 based on the data entry point 24a of the backup unit 20, i.e. enabling of the computing apparatus 12 to read and write data A 26a pointed by the data entry point 24a. In addition, in order to further protect data stored in the storage unit 22, the control unit 16 will perform encryption or decryption processing corresponding to the identification code of the RFID TAG 14 and to make the data reading or writing to and from the storage unit 22 of the data protection apparatus 10 to be encrypted or decrypted.

The backup unit 20 will back up the data entry points inside the data entry point area 22a to the backup unit 20, so as to use these data entry points for authentication and data protection. The reason why the data can be protected is that the unauthorized user will never know where the data entry points are unless he or she has passed the authentication process.

If a job execution status corresponding to the identification code of the RFID TAG 14 has disabled locking (such as when after authentication and during data transmission) and if the RFID TAG 14 once again approaches the authentication unit 18, the control unit 16 will then enable locking corresponding to the identification code of the corresponding RFID TAG 14, which then terminates data transmission, or disallows reading or writing operation after the current data transmission.

If the computing apparatus 12 is removed from the bus 13, which then disconnects the previous authenticated electrical connection (because of a positive authentication result) between the computing apparatus 12 and the data protection apparatus 10, the control unit 16 also will enable locking corresponding to the identification code of the RFID TAG 14.

If the data protection apparatus 10 is required to be turned off, the control unit 16 will enable locking corresponding to the identification codes of all of the RFID TAGs 14.

As mentioned above, if the job execution status corresponding to the identification code of the RFID TAG 14 has enabled locking, and if the RFID TAG 14 approaches the authentication unit 18, the control unit 16 will disable locking corresponding to the identification code of the corresponding RFID TAG 14.

In summary, in the data protection system 10 for controlling a data entry point according to the embodiment of the present invention, if an unauthorized and unauthenticated user cannot pass the authentication process, he or she cannot know where the data entry points are from inside the backup unit 20; and, therefore, cannot obtain data from inside the data area 22b of the storage unit 22. Therefore, only after the RFID TAG 14, similar to a key, has disabled locking, the system will provide a corresponding data entry point and the corresponding computing apparatus 12 is allowed to read data or write data into the storage unit 22.

Although the present invention has been described with reference to a specific embodiment for a complete and clear disclosure, the appended claims are not to be thus limited but are to be construed as embodying all modifications and alternative constructions that fairly fall within the scope of the present application.

What is claimed is:

1. A data protection system for controlling a data entry point, wherein a computing apparatus is allowed to read or write data only after locking is disabled, and the data protection system, comprising:
    a RFID TAG, storing at least one identification code; and
    a data protection apparatus, providing the reading or writing of a plurality of data, and the data protection apparatus, comprising:
        a storage unit, comprising a data entry point area and a data area for storing the physical data, and a plurality of data entry points inside the data entry point area are pointed to a plurality of specific sectors inside the data area, respectively;
        a backup unit, backing up the data entry points inside the data entry point area, and each data entry point is allocated to the identification code of the RFID TAG, respectively;
        an authentication unit, assessing whether the identification code is authenticated inside the backup unit, and generating a corresponding authentication result; and
        a control unit, enabling the computing apparatus to read or write to and from the storage unit based on the data entry point of the backup unit.

2. The data protection system for controlling the data entry point as claimed in claim 1, wherein the control unit is to enable locking corresponding to the identification code of the specific RFID TAG, and the computing apparatus cannot read or write data to and from the storage unit.

3. The data protection system for controlling the data entry point as claimed in claim 1, wherein a job execution status corresponding to the identification code of the RFID TAG has locking disabled, and the RFID TAG is to approach the authentication unit, and the control unit is to enable locking corresponding to the identification code of the RFID TAG.

4. The data protection system for controlling the data entry point as claimed in claim 1, wherein an authenticated electrical connection between the computing apparatus and the data protection apparatus is disconnected, the control unit is to enable locking corresponding to the identification code of the RFID TAG.

5. The data protection system for controlling the data entry point as claimed in claim 1, wherein the data protection apparatus is required to be turned off, and the control unit is to enable locking corresponding to the identification codes of all the RFID TAGs.

6. The data protection system for controlling the data entry point as claimed in claim 1, wherein a job execution status corresponding to the identification code of the RFID TAG has enabled locking, and the RFID TAG has approached the authentication unit, and the control unit is to disable locking corresponding to the identification code of the corresponding RFID TAG.

7. The data protection system for controlling the data entry point as claimed in claim 1, wherein the control unit is to perform an encryption or decryption processing corresponding to the identification code of the RFID TAG and to make the data writing or reading to and from the storage unit of the data protection apparatus to be encrypted or decrypted.

8. The data protection system for controlling the data entry point as claimed in claim 1, wherein an un-authenticated RFID TAG is to attempt to disable locking, the control unit is to reject reading or writing in response to the read/write requests from the computing apparatus.

* * * * *